March 16, 1954  A. B. WILLIAMS  2,671,981
TRAPPER DROWNING ROD
Filed June 25, 1951
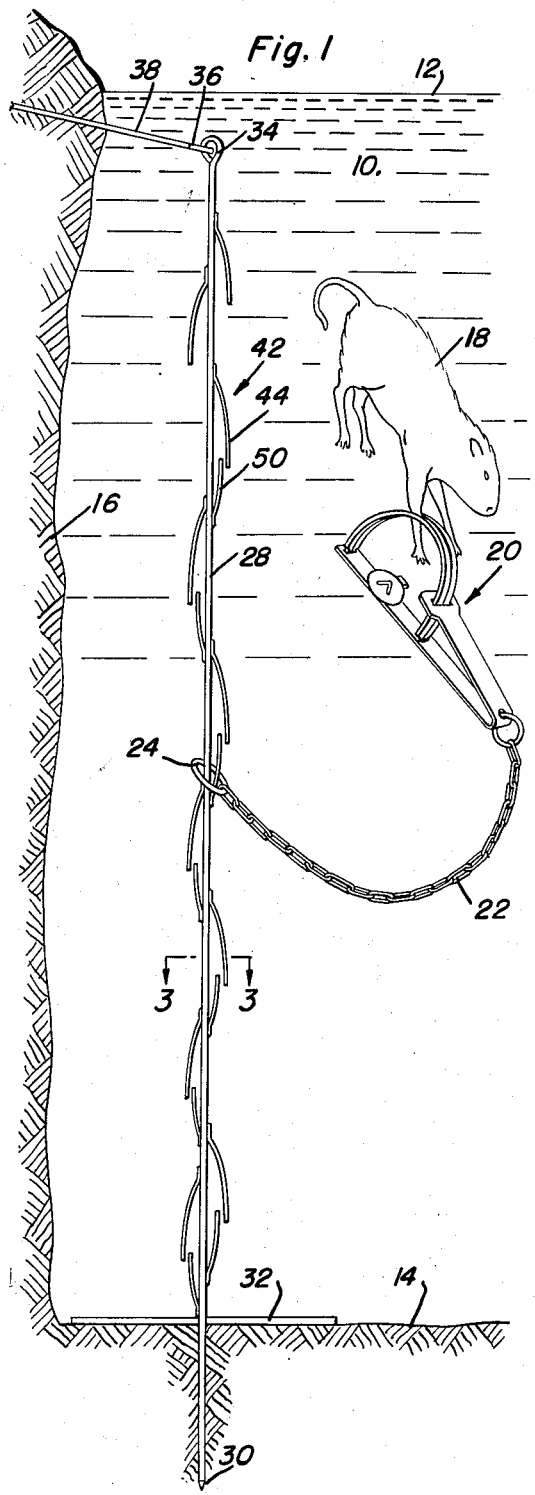
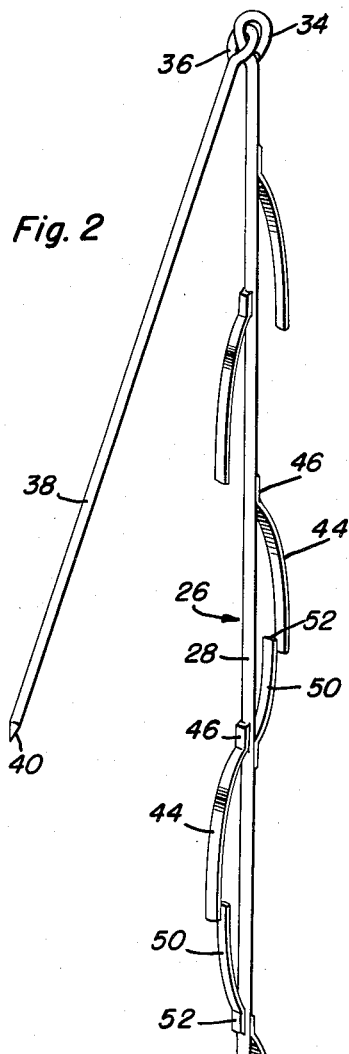
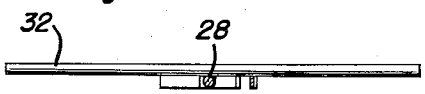
Andrew B. Williams
INVENTOR.

Patented Mar. 16, 1954

2,671,981

UNITED STATES PATENT OFFICE 2,671,981

TRAPPER DROWNING ROD

Andrew B. Williams, Boaz, Ala.

Application June 25, 1951, Serial No. 233,306

4 Claims. (Cl. 43—96)

This invention relates to a drowning rod or anchoring means for use with a conventional trap employed for such fur-bearing animals as minks, otters, beavers, and muskrats.

It is customary to place a conventional trap for a fur-bearing animal in a proper location adjacent a stream, lake or other body of water, and it has been found that once the animal has been caught in the trap it has a tendency to make for the water and dive therein with the trap thereon in an attempt to free itself from the trap, and then swim away. In this manner, many valuable fur-bearing animals are lost despite the fact that they are actualy caught in the trap. The primary object of this invention is to provide a trap anchoring and animal drowning stake which can be effectively anchored at its upper end to the bank of a stream and at its lower end in the bed or bottom of the stream with the chain normally associated with a trap slidably mounted on the stake which is in turn provided with a means to prevent the animal from working its way upwardly to the surface of the stream so that eventually the animal will drown and recovery thereof becomes simple.

Another important object of this invention is to provide a device of the character described which is relatively simple, inexpensive, easy to anchor in the proper location, and very effective for its intended purpose.

These, together with various ancillary objects and features of the invention which will later become apparent as the following description proceeds, are attained by the device, a preferred embodiment of which has been illustrated, by way of example only, in the accompanying drawings, wherein:

Figure 1 is an elevational view of the device shown in its properly anchored position;

Figure 2 is a fragmentary enlarged perspective view of the device; and

Figure 3 is a sectional view taken substantially on the plane of section line 3—3 of Figure 1.

Specific reference will now be made to the drawings. In the several views, in the accompanying drawings and in the following specification, similar reference characters indicate corresponding elements throughout.

Indicated generally at 10 is a body of water, such as a stream or lake, having an upper surface 12, the water being above a bed 14 and running along a bank 16. The fur-bearing animal is shown at 18 caught by one leg thereof in a conventional trap 20 which is provided with a chain 22 having an eye member or ring 24 at the free end thereof. The trap 20, chain 22 and ring 24 are usually positioned in an appropriate place on the top of the bank 16 adjacent the body of water 10 for catching the animal 18 and the present trap anchoring and drowning stake, indicated at 26, is associated with the trap to prevent the animal from reaching the top surface 12 of the water, thus effectively drowning the animal.

The device 26 comprises an elongated rod 28 having a spiked lower end 30 adapted to be inserted into the bed 14 and held in proper position thereon by a cross-piece 32 welded or riveted to the rod adjacent its spiked end. The upper end of the rod 28 is provided with an eye 34 pivotally engaging the eye 36 of a shorter rod 38 having a spiked free end 40 adapted to be driven into the bank 16 adjacent its upper end, as shown clearly in Figure 1. The ring 24 associated with the chain 22 of the trap 20 is slidably positioned upon the rod 28.

A means is provided on the rod 28 for limiting the upward movement of the animal 18 and trap so that the animal will be unable to reach the surface 12 of the water. This means comprises a plurality of vertically spaced catches 42 adapted to engage the ring 24. Each of the vertically spaced catches 42 includes a downwardly curved upper bar 44, welded or riveted at its upper end as at 46 to the rod, the lower free end 48 thereof being spaced from the rod 28 because of its arcuate or bowed contour. The catch further includes an upwardly curved or bowed lower bar 50 which is welded or riveted at its lower end 52 to the rod, this bar including an upper free end 52 which is also spaced from the rod 28 because of its curved or bowed contour. The free ends 48 and 52 of the bars 44 and 50 overlap to a slight extent, as shown clearly in the drawings, with the free end 48 of the upper bar 44 serving as the outer member and the free end 52 of the lower bar serving as the inner member.

In use, when the device is assembled, as shown clearly in the drawings, and the trap 20 is placed in proper position on the bank adjacent the stream 10, when the animal 18 is caught in the trap it will make for the stream and dive therein and the ring 24 will slide down the rod until the animal strikes the bed 14 of the stream. When the animal attempts to work its way up to the surface 12 of the stream, the ring 24 will enter between the curved bars 44 and 50, they being slightly resilient, and as a result the animal will be anchored to the rod 28, being unable to further move upwardly or downwardly. This will effectively drown the animal and allow ready recovery thereof.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In combination with an animal trap having a chain thereon and a ring on the free end of the chain, an elongated rod receiving said ring, means for anchoring the lower end of said rod in the bottom of a stream, means for anchoring the upper end of the rod to the bank of a stream, and means on said rod to prevent substantial upward movement of said ring on said rod said last-named means including vertically spaced catches, each catch including an upper downwardly curved resilient bar secured at its upper end to said rod and a lower upwardly curved resilient bar secured at its lower end to said rod, the free ends of said upper bars being in slightly spaced and overlapping relation with respect to the lower bars.

2. In combination with an animal trap having a chain thereon and a ring on the free end of the chain, an elongated rod receiving said ring, a plurality of longitudinally spaced catches on said rod to prevent movement of the ring thereon in one direction, each catch including an upper downwardly curved bar secured at its upper end to the rod and a lower upwardly curved bar secured at its lower end to said rod, the free ends of said bars being in slightly spaced and overlapping relation.

3. The combination of claim 2, wherein said catches are alternately disposed along the length of the rod.

4. The combination of claim 2, wherein the downwardly curved bars are longer than the upwardly curved bars and said bars extend parallel to the longitudinal axis of the rod.

ANDREW B. WILLIAMS.

References Cited in the file of this patent

UNITED STATES PATENTS

| Number | Name | Date |
|---|---|---|
| 63,478 | Cooper | Aug. 2, 1867 |
| 91,042 | Raiford | June 8, 1869 |
| 223,872 | Ashford | Jan. 27, 1880 |
| 2,275,737 | Dacey | Mar. 10, 1942 |
| 2,471,804 | Wheeler | May 31, 1949 |
| 2,472,926 | Sullivan | June 14, 1949 |